US008408591B2

(12) United States Patent
Walston

(10) Patent No.: US 8,408,591 B2
(45) Date of Patent: Apr. 2, 2013

(54) INFLATABLE CURTAIN AIRBAGS WITH EXPANDED-VOLUME LOWER PORTIONS FOR EJECTION MITIGATION

(75) Inventor: Bryan L. Walston, Perry, UT (US)

(73) Assignee: Autoliv ASP, Inc., Ogden, UT (US)

( * ) Notice: Subject to any disclaimer, the term of this patent is extended or adjusted under 35 U.S.C. 154(b) by 12 days.

(21) Appl. No.: 12/425,542

(22) Filed: Apr. 17, 2009

(65) Prior Publication Data
US 2010/0264630 A1   Oct. 21, 2010

(51) Int. Cl.
B60R 21/213 (2011.01)
(52) U.S. Cl. .................. 280/730.2; 280/730.1
(58) Field of Classification Search ............... 280/730.2, 280/730.1
See application file for complete search history.

(56) References Cited

U.S. PATENT DOCUMENTS

| | | | |
|---|---|---|---|
| 2,834,606 A | 5/1958 | Bertrand | |
| 3,687,485 A | 8/1972 | Campbell | |
| 3,804,435 A | 4/1974 | See et al. | |
| 4,657,105 A | 4/1987 | Miyada | |
| 4,906,020 A | 3/1990 | Haberer | |
| 5,007,662 A | 4/1991 | Abramczyk et al. | |
| 5,322,322 A | 6/1994 | Bark et al. | |
| 5,458,366 A | 10/1995 | Hock et al. | |
| 5,470,103 A | 11/1995 | Vaillancourt et al. | |
| 5,480,181 A | 1/1996 | Bark et al. | |
| 5,556,128 A | 9/1996 | Sinnhuber et al. | |
| 5,570,900 A | 11/1996 | Brown | |
| 5,588,672 A | 12/1996 | Karlow et al. | |
| 5,707,075 A | 1/1998 | Kraft et al. | |
| 5,913,536 A | 6/1999 | Brown | |
| 5,988,735 A | 11/1999 | Muller | |
| 6,076,854 A | 6/2000 | Schenck et al. | |
| 6,095,551 A | 8/2000 | O'Docherty | |
| 6,135,493 A | 10/2000 | Jost et al. | |
| 6,152,481 A | 11/2000 | Webber et al. | |
| 6,155,596 A | 12/2000 | Nakajima et al. | |
| 6,176,513 B1 * | 1/2001 | Neidert | 280/729 |

(Continued)

FOREIGN PATENT DOCUMENTS

| | | |
|---|---|---|
| DE | 19841347 | 3/2000 |
| DE | 10115064 | 11/2002 |

(Continued)

OTHER PUBLICATIONS

Office Action issued Oct. 10, 2007 in U.S. Appl. No. 11/222,006, now U.S. Patent No. 7,556,286.

(Continued)

Primary Examiner — Drew Brown
(74) Attorney, Agent, or Firm — Stoel Rives LLP

(57) ABSTRACT

An inflatable curtain airbag can be used to cushion an occupant during a vehicle collision as well as retaining the occupant within the vehicle during a rollover event. Curtain airbags that do not extend to the vehicle's waist line may allow the occupant to fit between the bottom of the curtain airbag and the waistline, and thereby be ejected from the vehicle. This risk is increased with vehicles that do not have vertical pillars between the doors and windows of the vehicle. Increasing an inflation gas volume capacity of a lower portion of the airbag, may mitigate the risk of occupant ejection, if the increased volume portion of the curtain overlaps the vehicle pillars. The lower portion of the curtain airbag may have a first chamber and a separate second chamber.

5 Claims, 7 Drawing Sheets

U.S. PATENT DOCUMENTS

| | | | |
|---|---|---|---|
| 6,224,091 | B1 | 5/2001 | Eyrainer et al. |
| 6,237,938 | B1 | 5/2001 | Boxey |
| 6,237,943 | B1 | 5/2001 | Brown et al. |
| 6,312,009 | B1 | 11/2001 | Haland et al. |
| 6,390,501 | B1 | 5/2002 | Greib et al. |
| 6,474,681 | B2 | 11/2002 | Peer et al. |
| 6,485,049 | B1* | 11/2002 | Prottengeier et al. ....... 280/730.2 |
| 6,502,854 | B2 | 1/2003 | Mueller |
| 6,505,853 | B2 | 1/2003 | Brannon et al. |
| 6,517,110 | B1 | 2/2003 | Butters et al. |
| 6,527,296 | B2 | 3/2003 | Bakhsh et al. |
| 6,568,706 | B2 | 5/2003 | Mueller |
| 6,575,496 | B2 | 6/2003 | Hess et al. |
| 6,631,921 | B1 | 10/2003 | Drossler et al. |
| 6,676,154 | B2 | 1/2004 | Fischer |
| 6,695,341 | B2 | 2/2004 | Winarto et al. |
| 6,695,342 | B2 | 2/2004 | Tanase et al. |
| 6,709,008 | B2 | 3/2004 | McGee et al. |
| 6,773,031 | B2 | 8/2004 | Haig |
| 6,793,239 | B2 | 9/2004 | Feldman et al. |
| 6,851,706 | B2 | 2/2005 | Roberts et al. |
| 6,932,384 | B2 | 8/2005 | Waid et al. |
| 7,083,188 | B2 | 8/2006 | Henderson et al. |
| 7,125,069 | B2 | 10/2006 | Cacucci et al. |
| 7,165,783 | B2 | 1/2007 | Karlbauer et al. |
| 7,261,316 | B1 | 8/2007 | Salmo et al. |
| 7,264,267 | B2 | 9/2007 | Kino et al. |
| 7,419,184 | B2 | 9/2008 | Green et al. |
| 7,556,286 | B2 | 7/2009 | Powals |
| 7,628,421 | B2 | 12/2009 | Wright |
| 7,735,863 | B2 | 6/2010 | Walston et al. |
| 7,762,579 | B2 | 7/2010 | Garner |
| 7,770,917 | B2 | 8/2010 | Henderson et al. |
| 7,806,432 | B2 | 10/2010 | Nelson et al. |
| 2001/0033073 | A1 | 10/2001 | Hammond et al. |
| 2002/0175504 | A1* | 11/2002 | Tanase et al. .............. 280/730.2 |
| 2003/0141708 | A1 | 7/2003 | Enders |
| 2004/0066022 | A1 | 4/2004 | Mori et al. |
| 2004/0100077 | A1 | 5/2004 | Ogata |
| 2004/0232665 | A1 | 11/2004 | Bendig et al. |
| 2004/0256844 | A1 | 12/2004 | Hsu et al. |
| 2005/0082797 | A1 | 4/2005 | Welford et al. |
| 2005/0127644 | A1 | 6/2005 | Kino et al. |
| 2005/0184493 | A1 | 8/2005 | Hofmann et al. |
| 2005/0212270 | A1 | 9/2005 | Wipasuramonton et al. |
| 2005/0212273 | A1 | 9/2005 | Thomas et al. |
| 2005/0269806 | A1 | 12/2005 | Huber et al. |
| 2005/0285378 | A1 | 12/2005 | Noguchi et al. |
| 2006/0066080 | A1 | 3/2006 | Ikeda et al. |
| 2006/0097491 | A1 | 5/2006 | Saberan et al. |
| 2006/0125213 | A1 | 6/2006 | Kruse |
| 2006/0138754 | A1 | 6/2006 | Hirata et al. |
| 2006/0163849 | A1 | 7/2006 | Keshavaraj |
| 2006/0175814 | A1 | 8/2006 | Jang et al. |
| 2006/0214401 | A1 | 9/2006 | Hirata |
| 2007/0001434 | A1 | 1/2007 | Berntsson |
| 2007/0029764 | A1 | 2/2007 | Ochiai et al. |
| 2007/0045999 | A1 | 3/2007 | Saberan et al. |
| 2007/0046001 | A1 | 3/2007 | Hirata |
| 2007/0052212 | A1 | 3/2007 | Powals |
| 2008/0012275 | A1 | 1/2008 | Pinsenschaum et al. |
| 2008/0106072 | A1 | 5/2008 | Walston et al. |
| 2008/0106083 | A1 | 5/2008 | Walston |
| 2008/0238045 | A1 | 10/2008 | Garner |
| 2009/0014989 | A1 | 1/2009 | Henderson et al. |
| 2009/0058054 | A1 | 3/2009 | Nelson et al. |
| 2009/0218798 | A1 | 9/2009 | Garner |

FOREIGN PATENT DOCUMENTS

| | | |
|---|---|---|
| EP | 924122 | 11/1998 |
| EP | 1264742 | 2/2005 |
| EP | 1634778 | 3/2006 |
| EP | 1676758 | 7/2006 |
| JP | 2007069764 A | 3/2007 |
| WO | WO 2006/084633 | 8/2006 |
| WO | WO 2006/024472 | 9/2006 |
| WO | WO 2008/124205 | 10/2008 |

OTHER PUBLICATIONS

Amendment and Response to Office Action filed Mar. 10, 2008 in U.S. Appl. No. 11/222,006, now U.S. Patent No. 7,556,286.
Office Action issued Jul. 1, 2008 in U.S. Appl. No. 11/222,006, now U.S. Patent No. 7,556,286.
Amendment and Response to Office Action filed Nov. 26, 2008 in U.S. Appl. No. 11/222,006, now U.S. Patent No. 7,556,286.
Notice of Allowance and Fee(s) Due issued Mar. 11, 2009 in U.S. Appl. No. 11/222,006, now U.S. Patent No. 7,556,286.
Preliminary Amendment filed Nov. 24, 2008 in U.S. Appl. No. 11/593,281, now U.S. Patent No. 7,735,863.
Office Action issued Dec. 26, 2008 in U.S. Appl. No. 11/593,281, now U.S. Patent No. 7,735,863.
Amendment and Response to Office Action filed Apr. 27, 2009 in U.S. Appl. No. 11/593,281, now U.S. Patent No. 7,735,863.
Office Action issued Aug. 20, 2009 in U.S. Appl. No. 11/593,281, now U.S. Patent No. 7,735,863.
Amendment and Response to Office Action filed Aug. 26, 2009 in U.S. Appl. No. 11/593,281, now U.S. Patent No. 7,735,863.
Notice of Allowance and Fee(s) Due issued Sep. 15, 2009 in U.S. Appl. No. 11/593,281, now U.S. Patent No. 7,735,863.
Request for Continued Examination filed Nov. 12, 2009 in U.S. Appl. No. 11/593,281, now U.S. Patent No. 7,735,863.
Notice of Allowance and Fee(s) Due issued Feb. 24, 2010 in U.S. Appl. No. 11/593,281, now U.S. Patent No. 7,735,863.
Office Action issued May 15, 2009 in U.S. Appl. No. 11/731,980, now U.S. Patent No. 7,762,579.
Amendment and Response to Office Action filed Nov. 16, 2009 in U.S. Appl. No. 11/731,980, now U.S. Patent No. 7,762,579.
Notice of Allowance and Fee(s) Due issued Mar. 11, 2010 in U.S. Appl. No. 11/731,980, now U.S. Patent No. 7,762,579.
Notice of Drawing Inconsistency with Specification issued May 5, 2010 in U.S. Appl. No. 11/731,980, now U.S. Patent No. 7,762,579.
Amendment Under 37 C.F.R. § 1.312 filed May 18, 2010 in U.S. Appl. No. 11/731,980, now U.S. Patent No. 7,762,579.
Response to Rule 312 Communication issued Jun. 16, 2010 in U.S. Appl. No. 11/731,980, now U.S. Patent No. 7,762,579.
Restriction Requirement issued Aug. 19, 2009 in U.S. Appl. No. 11/777,120, now U.S. Patent No. 7,770,917.
Amendment and Response to Requirement for Election of Invention and Election of Species filed Aug. 27, 2009 in U.S. Appl. No. 11/777,120, now U.S. Patent No. 7,770,917.
Office Action issued Sep. 29, 2009 in U.S. Appl. No. 11/777,120, now U.S. Patent No. 7,770,917.
Amendment and Response to Office Action filed Feb. 23, 2010 in U.S. Appl. No. 11/777,120, now U.S. Patent No. 7,770,917.
Interview Summary issued Mar. 12, 2010 in U.S. Appl. No. 11/777,120, now U.S. Patent No. 7,770,917.
Notice of Allowance and Fee(s) Due issued Apr. 1, 2010 in U.S. Appl. No. 11/777,120, now U.S. Patent No. 7,770,917.
Office Action issued May 1, 2009 in U.S. Appl. No. 11/850,426, now U.S. Patent No. 7,806,432.
Amendment and Response to Office Action filed Nov. 2, 2009 in U.S. Appl. No. 11/850,426, now U.S. Patent No. 7,806,432.
Office Action issued Feb. 23, 2010 in U.S. Appl. No. 11/850,426, now U.S. Patent No. 7,806,432.
Terminal Disclaimer and Amendment and Response to Office Action filed May 28, 2010 in U.S. Appl. No. 11/850,426, now U.S. Patent No. 7,806,432.
Notice of Allowance and Fee(s) Due issued Jun. 29, 2010 in U.S. Appl. No. 11/850,426, now U.S. Patent No. 7,806,432.
Restriction Requirement issued May 11, 2009 in U.S. Appl. No. 12/040,624, now abandoned.
Amendment and Response to Requirement for Election of Species filed Jun. 11, 2009 in U.S. Appl. No. 12/040,624, now abandoned.
Office Action issued Aug. 19, 2009 in U.S. Appl. No. 12/040,624, now abandoned.

Amendment and Response to Office Action filed Jan. 19, 2010 in U.S. Appl. No. 12/040,624, now abandoned.
Office Action issued Feb. 18, 2010 in U.S. Appl. No. 12/040,624, now abandoned.
Notice of Abandonment issued Sep. 20, 2010 in U.S. Appl. No. 12/040,624, now abandoned.

Notification of Transmittal of the International Search Report and the Written Opinion of the International Searching Authority issued Aug. 1, 2008 in International Application No. PCT/US2008/052876.

* cited by examiner

INFLATABLE CURTAIN AIRBAGS WITH EXPANDED-VOLUME LOWER PORTIONS FOR EJECTION MITIGATION

TECHNICAL FIELD

The present disclosure relates generally to the field of automotive protective systems. More specifically, the present disclosure relates to inflatable curtain airbags, which may provide improved cushioning for an occupant during a collision event and improve retention of the occupant within the vehicle during a rollover event.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

DETAILED DESCRIPTION OF PREFERRED EMBODIMENTS

Figure 1:
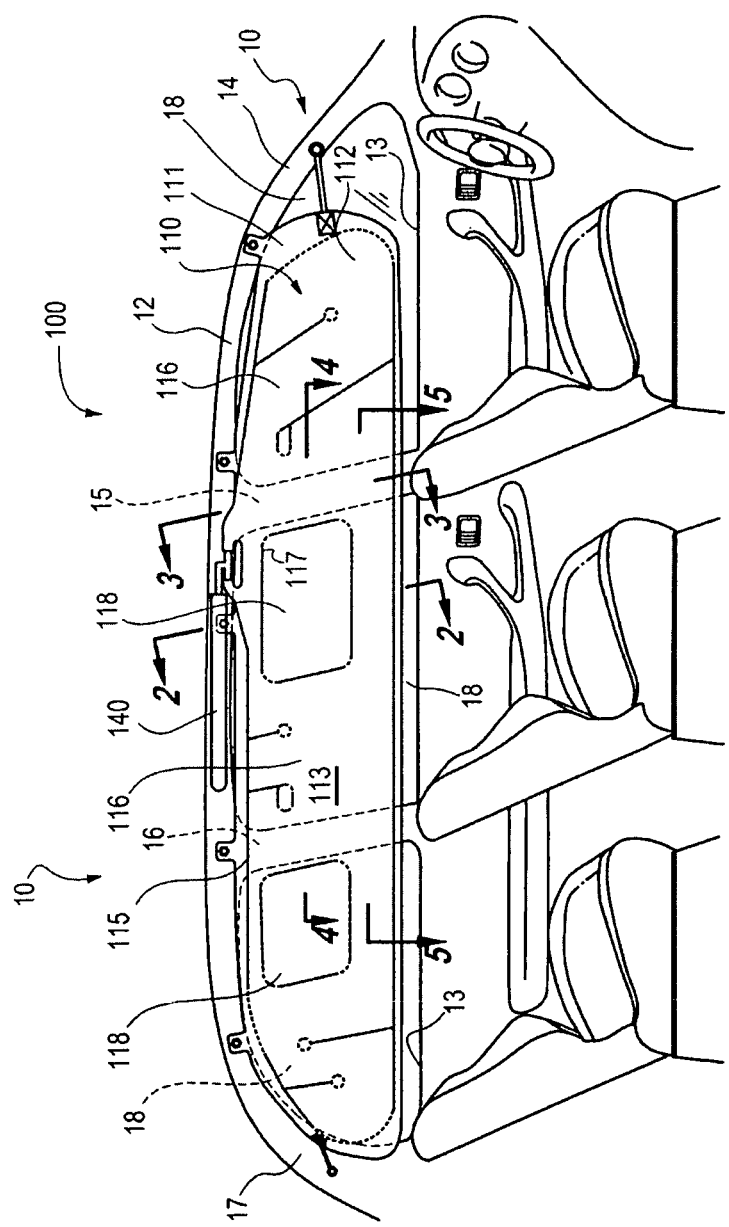
FIG. 1 is a side elevation view of an inflatable curtain airbag assembly.

It will be readily understood that the components of the embodiments, as generally described and illustrated in the figures herein, could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to: the steering wheel, the instrument panel, within the side doors or side seats, adjacent to the roof rail of the vehicle, in an overhead position, or at the knee or leg position. In the following disclosure, "airbag" may refer to an inflatable curtain airbag, overhead airbag, front airbag, or any other airbag type.

Inflatable curtain airbags may be used to protect the passengers of a vehicle during a side collision or roll-over collision. Inflatable curtain airbags typically extend longitudinally within the vehicle and are usually coupled to or next to the roof rail of the vehicle. The inflatable curtain airbag may expand in a collision scenario along the side of the vehicle between the vehicle passengers and the side structure of the vehicle. In a deployed state, an inflatable curtain airbag may cover at least a portion of the side windows and the B-pillar of the vehicle. In some embodiments, inflatable curtain airbags may extend from the A-pillar to the C-pillar of the vehicle. In alternative embodiments, inflatable curtain airbags may extend from the A-pillar to the D-pillar of the vehicle.

Inflatable curtain airbags are typically installed adjacent the roof rail of a vehicle in an undeployed state, in which the inflatable curtain airbag is rolled or folded or a combination thereof and retained in the rolled and/or folded configuration by being wrapped at certain points along the airbag. The rolled and/or folded configuration may be called a "packaged" configuration. When deployed, the airbag exits the packaged state and assumes an extended state, wherein the airbag is inflated. The extended and inflated state may be called a "deployed" state or configuration. Thus, an airbag mounting apparatus typically allows for a secure connection between the vehicle and the airbag, yet allows the airbag to change configurations from the packaged configuration to the deployed configuration.

Inflatable curtain airbags may include attachment tabs at the top edge and at various locations along the longitudinal length of the inflatable curtain airbag. In some embodiments, the inflatable curtain may not have tabs, but rather the curtain may have an uninflatable portion that is on the top edge of the curtain. During a conventional installation, bolts or other fasteners are used to attach the curtain to the roof rail via the tabs or uninflatable areas. Often, a mounting bracket is employed to couple the curtain to the roof rail.

FIG. 1 is a side elevation view of an inflatable curtain airbag assembly 100. Airbag assembly 100 may comprise an inflatable airbag membrane 110, and an inflator 140. Assembly 100 is configured to provide impact protection and ejection mitigation for occupants of a vehicle 10. Vehicle 10 has a roof rail 12, a waist line 13, an A-pillar 14, a B-pillar 15, a C-pillar 16, a D-pillar 17, and windows 18. Waist line 13 may also be known as a "belt line" and is defined as a substantially horizontal line formed by the junction of vehicle windows 13 and tops of vehicle door panels. In other words, the waist line may be formed by the window sills of the vehicle doors.

According to the embodiment depicted in FIG. 1, airbag 110 has an upper portion 111, a lower portion 112, a front face 113, a rear face (not visible), an outer seam 115, inflation cells 116, inner seams 117, uninflatable portions 118, and an inflatable void (not visible). The various faces of airbag membrane 110 define the inflatable void, which is in fluid communication with an inflator 140. The various faces of airbag 110 may be attached to each other using an outer seam 115 that comprise stitching. Likewise, inner seams 117 may comprise stitching and may couple the front and rear faces together, as well as forming uninflatable portions 118 and inflation cells 116. In the depicted embodiment, airbag 110 is an inflatable curtain airbag, which extends from an A-pillar 14 to a D-pillar 17. Airbag 110 also extends past a B-pillar 15 and a C-pillar 16 such that in a deployed configuration, the airbag at least partially covers the B- and C-pillars.

Upper portion 111 of airbag 110 is the portion of the airbag that is closest to the headliner of a vehicle when the airbag is in a deployed state. Lower portion 112 is below upper portion 111 when airbag 110 is in a deployed state, and is closest to a floor of the vehicle. The term "lower portion" is not necessarily limited to the portion of airbag 110 that is below a horizontal medial plane of the airbag, but may include less than half, more than half or exactly half of the bottom portion of the airbag. Likewise, the term "upper portion" is not necessarily limited to the portion of airbag 110 that is above a horizontal medial plane of the airbag, but may include less than half, more than half or exactly half of the top portion of the airbag.

Inflator 140 may be attached to roof rail 12, or any other suitable vehicle structure. Upon activation, inflator 140 rapidly generates or releases inflation gas, which forces airbag 110 through a cosmetic cover on roof rail 12 and rapidly inflates the airbag. The inflator may be one of several types, such as pyrotechnic, stored gas, or a combination inflator and may comprise a single stage or multistage inflator.

As will be appreciated by those skilled in the art, a variety of types and configurations of airbag membranes can be utilized without departing from the scope and spirit of the present disclosure. For example, the size, shape, and proportions of the airbag membrane may vary according to its use in different vehicles. Also, the airbag membrane may comprise one or more materials that are well known in the art, such as a woven nylon fabric. Additionally, the airbag may be manufactured using a variety of techniques such as one piece weaving, cut and sew, or a combination of the two techniques. Further, the airbag membrane may be manufactured using sealed or unsealed seams, wherein the seams are formed by stitching, adhesive, taping, radio frequency welding, heat sealing, or any other suitable technique or combination of techniques.

One skilled in the art will also appreciate that the size, shape and distribution of the inflation cells depicted in FIG. 1 are for exemplary purposes and may vary from the depiction. Further, in order for the fully inflated airbag to adopt a predetermined shape, internal and/or external tethers may be used, wherein the tethers limit the expansion of the airbag and restrict it to the predetermined shape or apply tension to predetermined portions of the airbag. Tethers are typically coupled to one or more surfaces of an airbag membrane and extend to another surface of the airbag, the airbag housing, or a vehicle structure.

Figure 3:
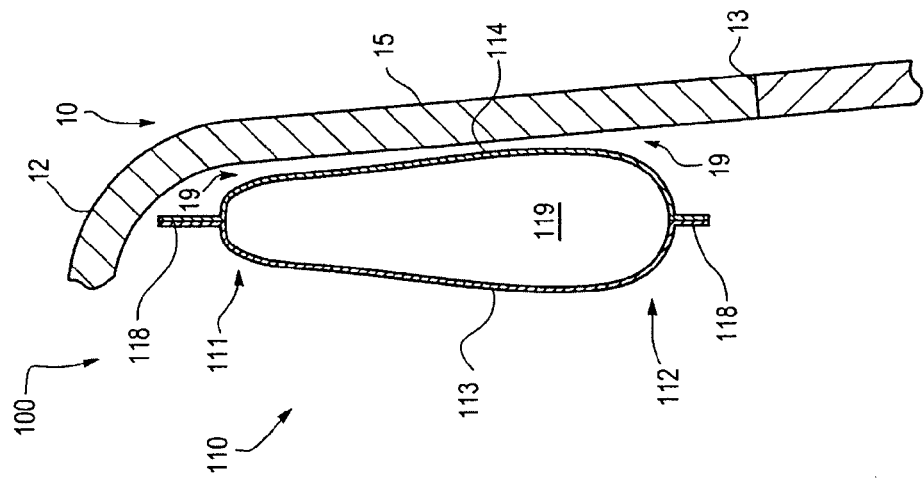
FIG. 3 is another side elevation cross-sectional view of the inflatable curtain airbag assembly of FIG. 1.
Figure 2:
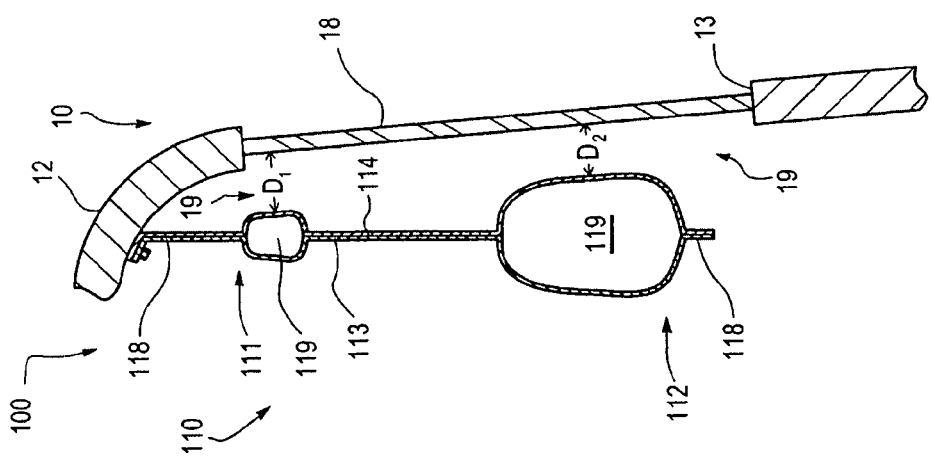
FIG. 2 is a side elevation cross-sectional view of the inflatable curtain airbag assembly of FIG. 1.

FIGS. 2-3 are side elevation cross-sectional views of portions of vehicle 10 and airbag assembly 100 depicting roof rail 12, waist line 13, window 18 (FIG. 2) or B-pillar 15 (FIG. 3), and a space between the vehicle and the airbag 19. Also depicted in FIGS. 2-3 is inflatable airbag 110 and its upper portion 111, lower portion 112, front face 113, rear face 114, uninflatable portions 118, and the inflatable void 119.

FIG. 2 depicts a side elevation cross-sectional view of vehicle 10 and assembly 100 at window 18, which is between the B-pillar and the C-pillar. In this depiction, bottom portion airbag 110 does not overlap waistline 13. Window 18 is not perpendicular to the ground; rather the window is slanted out from top to bottom. At cross section line 2-2 of FIG. 1, airbag 110 has two inflatable voids 119, wherein the inflatable void portion of the airbag that is on upper portion 111 has a smaller volume than the inflatable void portion of the airbag that is on lower portion 112. As such, airbag 110 may be said to have an asymmetrical side elevation cross-section. In other words the side elevation cross-section of airbag 110 may be said to be pear-shaped. In another embodiment, the inflatable airbag curtain airbag may be said to be tear-drop shaped. The lower portion may be configured such that the lower portion lacks inflation cells, or has a fewer number of inflation cells than the top portion. In this way, the volume of the lower portion may not be as constrained as the top portion. Airbag 110 is configured such that a distance $D_1$ from inflatable void 119 of top portion 111 to window 18 is similar to the distance $D_2$ from the inflatable void 110 of bottom portion 112 to window 18.

By way of example, and not limitation, in various embodiments, a cross-sectional width of the upper inflation chamber of upper portion 111, as shown in FIG. 2, has a magnitude of about 0 mm to about 250 mm, and a cross-sectional width of the lower inflation chamber of lower portion 112 has a magnitude of about 350 mm to about 400 mm upper portion. However, as one skilled in the art will recognize, the actual widths of the inflatable curtain cushion may be varied for use in different vehicle environments.

FIG. 3 depicts a side elevation cross-sectional view of vehicle 10 and assembly 100 at B-pillar 15. B-pillar 15 is not perpendicular to the ground or to a horizontal axis of vehicle 10. Also, B-pillar is not perpendicular to a vertical axis of vehicle 10. At cross section line 3-3 of FIG. 1, airbag 110 has a single inflatable void 119 that spans the top portion and the bottom portion of the airbag, and the airbag does not overlap waist line 13. The side elevation cross-sectional shape of the inflatable void is pear-shaped, such that bottom portion 112 of the airbag has a larger cross-section than top portion 111. It may also be said that the bottom portion has a larger volume than the top portion. Since B-pillar is not perpendicular to the ground, but rather extends outwardly from the top of the pillar to the bottom, airbag 110 is configured to be pear-shaped so that the distance between B-pillar 15 and rear face 114 of airbag 110 is similar from top portion 111 to bottom portion 112. In other words, the airbag curtain has a surface facing the pillars that follows the contours of the pillars such that the surface is located at an approximately equal distance from the top to the bottom of each pillar. Space 19 between an inner surface of B-pillar 15 and airbag 110 may be the same for the C-pillar as the B-pillar. Also, space 19 may not exist as airbag 110 may be configured such that rear face 114 abuts the inner surface of B-pillar 15.

An inflatable curtain airbag that does not overlap the waistline of a vehicle may swing outwardly when an occupant impacts the airbag during a collision and/or rollover event. This is especially true when a non-waistline overlapping airbag is used in a vehicle with windows or pillars that extend outwardly. When in a deployed state, the asymmetrical side elevation cross-section of airbag 110 allows more tension to be placed on bottom portion 112 than would occur if the airbag were symmetrical. As such, the extra volume of the lower portion of airbag 110 allows the airbag to mitigate the risk of occupant ejection.

One skilled in the art will recognize that the size and distribution of the larger volume portions of the airbag may vary. For example, the entire side elevation cross-sectional shape of the airbag may not be pear-shaped. For example, at some portions of the airbag, the airbag may not comprise an upper inflatable void. At other portions of the airbag, the airbag may not have any inflatable voids. At some portions of the airbag, the airbag may have a symmetrical side elevation cross-section. Further, one skilled in the art will recognize that in some embodiments, the inflatable void of the bottom portion may run the entire length of airbag 110 and may not have a larger cross-section than other inflatable voids within the airbag.

By way of example, and not limitation, in various embodiments, a cross-sectional width of the upper inflation chamber of upper portion 111, as shown in FIG. 3, has a magnitude of about 0 mm to about 250 mm, and a cross-sectional width of the lower inflation chamber of lower portion 112 has a magnitude of about 350 mm to about 400 mm. However, as one skilled in the art will recognize, the actual widths of the inflatable curtain cushion may be varied for use in different vehicle environments.

Figure 4:
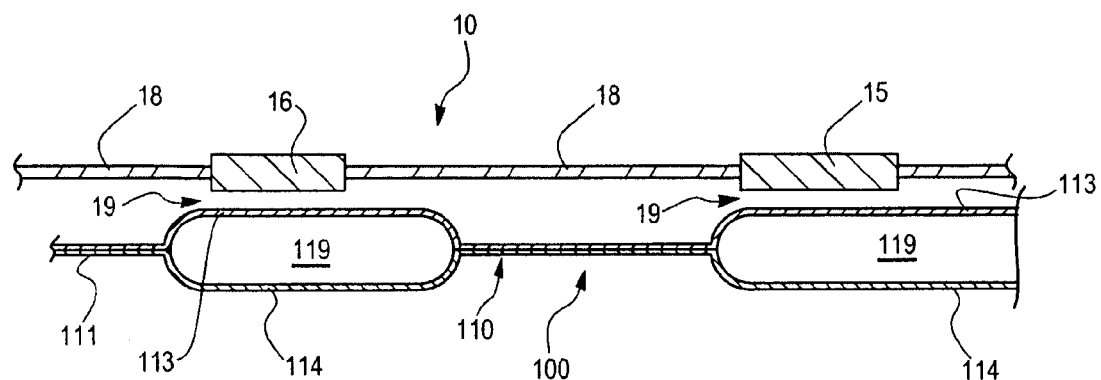
FIG. 4 is a top elevation cross-sectional view of the inflatable curtain airbag assembly of FIG. 1.
Figure 5:
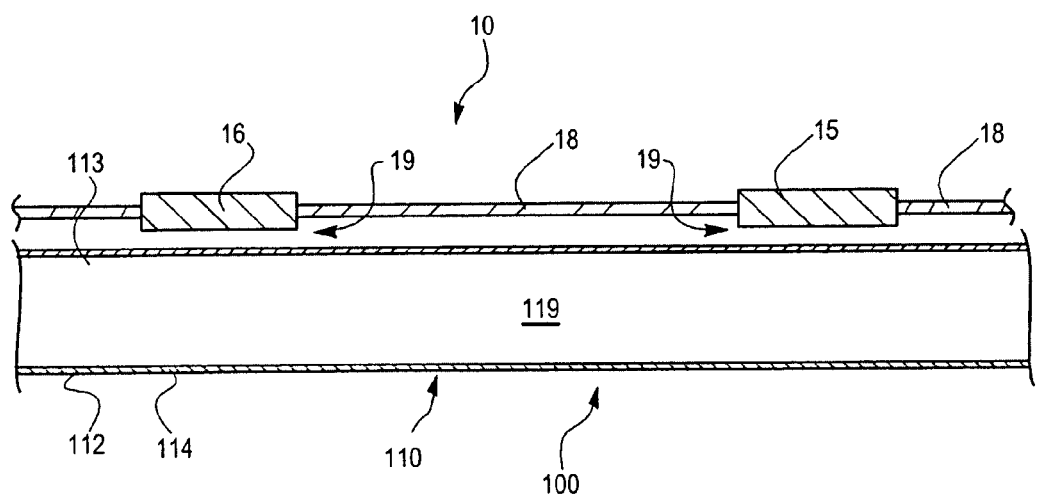
FIG. 5 is another top elevation cross-sectional view of the inflatable curtain airbag assembly of FIG. 1.

FIGS. 4-5 are top elevation cross-sectional views of portions of vehicle 10 and assembly 100. Vehicle 10 is depicted at B-pillar 15 and C-pillar 16, wherein a window 18 is visible between the pillars as well as the side of each pillar. Airbag 110 is depicted at top portion 111 (FIG. 4) and bottom portion 112 (FIG. 5) wherein front face 113, rear face 114 and inflatable void 119 are visible. Space 19 between vehicle 10 and airbag 110 is about equal between top portion 111 and bottom portion 112. In the depiction of FIG. 4, top portion 111 of airbag 110 has two inflatable voids 119. In the depiction of FIG. 5, bottom portion 112 of airbag 110 has a single inflatable void that runs continuously along airbag 110. In the depictions of FIGS. 4-5, a distance between front face 113 and rear face 114 of the inflatable voids of airbag 110 is smaller for upper portion 111 than lower portion 112.

Figure 6:
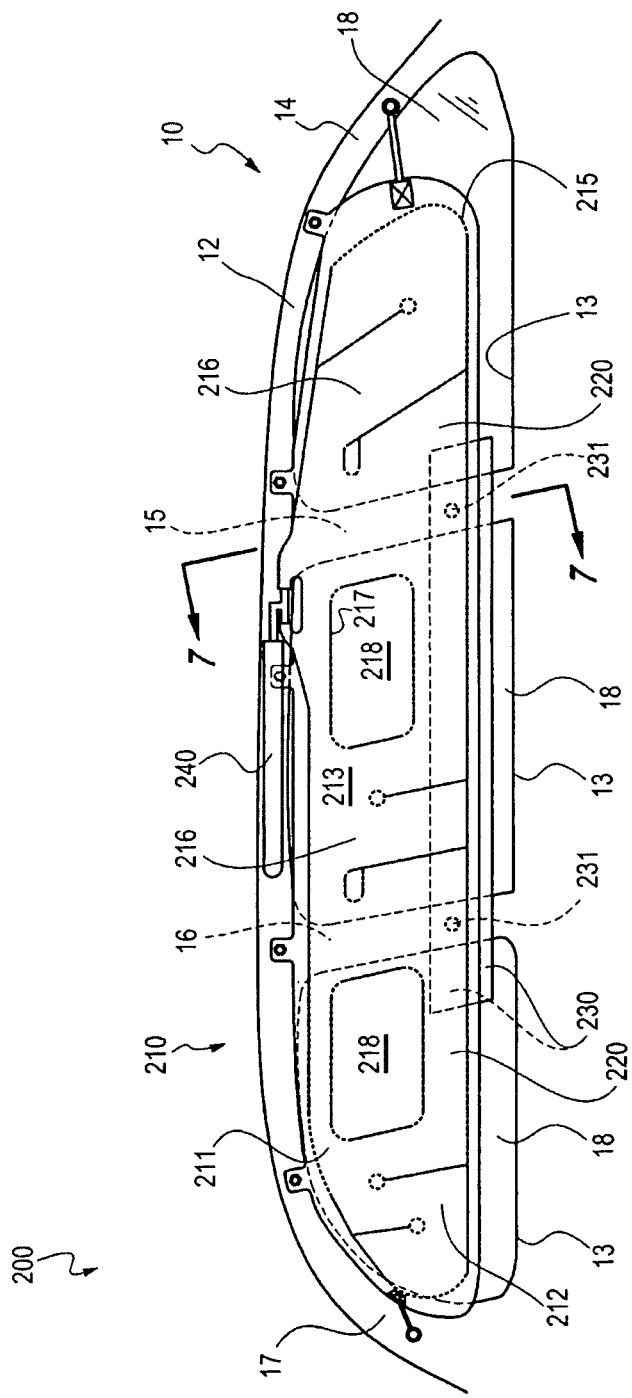
FIG. 6 is a side elevation view of another embodiment of an inflatable curtain airbag assembly.

FIG. 6 is a side elevation view of another embodiment of an inflatable airbag assembly 200 that is configured to mitigate the risk of occupant ejection. Airbag assembly 200 may be configured similarly to, and may function similarly as airbag assembly 100, described herein. Inflatable airbag assembly 200 may comprise an inflatable airbag 200, a second chamber 230, and an inflator 240. Assembly 200 is configured to impact protection and ejection mitigation for occupants of a vehicle 10. Vehicle 10 has a roof rail 12, a waist line 13, an A-pillar 14, a B-pillar 15, a C-pillar 16, a D-pillar 17, and windows 18. Waist line 13 may also be known as a belt line and is defined as a substantially horizontal line formed by the junction of vehicle windows 13 and tops of vehicle door panels. In other words, the waist line may be formed by the window sills of the vehicle doors.

According to the embodiment depicted in FIG. 6, airbag 210 has an upper portion 211, a lower portion 212, a front face 213, a rear face (not visible), an exterior seam 215, inflation cells 216, interior seams 217, uninflatable portions 218, an inflatable void (not visible), and a first chamber 220. The various faces of airbag membrane 210 define the inflatable void, which is in fluid communication with an inflator 240. The various faces of airbag 210 may be attached to each other using an outer seam 215 that comprise stitching. Likewise, inner seams 216 may comprise stitching and may couple the front and rear faces together, as well as forming uninflatable portions 218 and inflation cells 215. In the depicted embodiment, airbag 210 is an inflatable curtain airbag, which extends from an A-pillar 14 to a D-pillar 17. Airbag 210 also extends past a B-pillar 15 and a C-pillar 16 such that in a deployed configuration, the airbag at least partially covers the B- and C-pillars. Second chamber 230 is configured to cover predetermined vehicle pillars, such as B-pillar 15 and C-pillar 16, in a longitudinal manner.

Upper portion 211 of airbag 210 is the portion of the airbag that is closest to the headliner of a vehicle when the airbag is in a deployed state. Lower portion 212 is below upper portion 211 when airbag 210 is in a deployed state, and is closest to a floor of the vehicle. The term "lower portion" is not necessarily limited to the portion of airbag 210 that is below a horizontal medial plane of the airbag, but may include less than half, more than half or exactly half of the bottom portion of the airbag. Likewise, the term "upper portion" is not necessarily limited to the portion of airbag 210 that is above a horizontal medial plane of the airbag, but may include less than half, more than half or exactly half of the top portion of the airbag.

Figure 7:
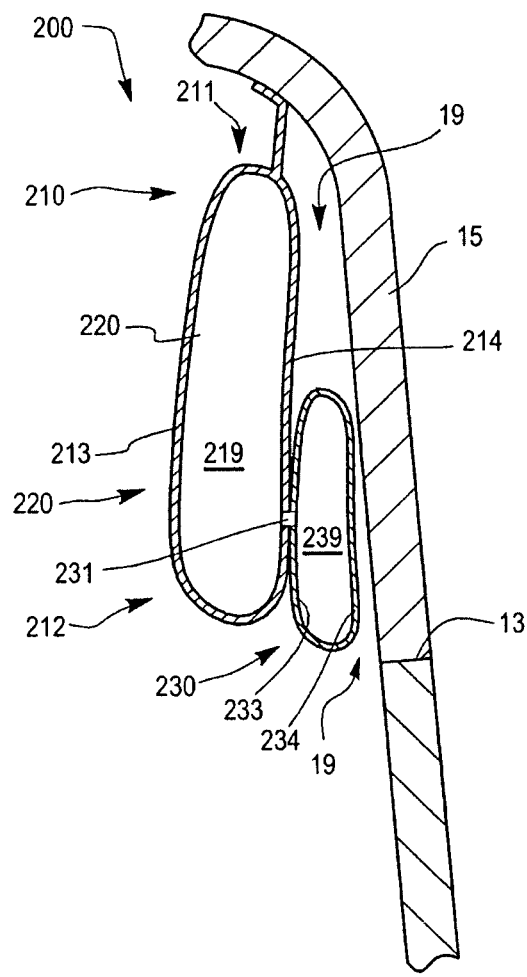
FIG. 7 is a side elevation cross-sectional view of the inflatable curtain airbag assembly of FIG. 6.

FIG. 7 depicts a side elevation cross-sectional view of vehicle 10 and assembly 200 at B-pillar 15. At cross section line 7-7 of FIG. 6, airbag 210 has an inflatable void 219 defined by front and rear faces 213 and 214. Inflatable void 219 spans top portion 211 and bottom portion 212 of the airbag. Airbag 210 does not overlap waist line 13. First chamber 220 may comprise an entirety of inflatable void 219, or the first chamber may comprise one or more inflation cells located on bottom portion 212 of airbag 210. The side elevation cross-sectional shape of inflatable void 219 is substantially symmetrical, such that top portion 211 of airbag 210 has a cross-section width that is similar to bottom portion 212. Since B-pillar 15 is not perpendicular to the ground, but rather extends outwardly from the top of the pillar to the bottom, airbag 210 is closer to B-pillar 15 at top portion 211 than bottom portion 212. As such, the space 19 between bottom portion 212 of airbag 210 is greater than the space 19 between top portion 211 and B-pillar 15.

As indicated above, an inflatable curtain airbag that does not overlap the waistline of a vehicle may swing outwardly when an occupant or object impacts the airbag during a collision and/or rollover event, which is especially true when a non-waistline overlapping airbag is used in a vehicle with windows or pillars that extend outwardly. As such, a second chamber 230 may be used in conjunction with airbag 210, which has a symmetric side elevation cross-section. Second chamber 230 is located between an inner surface of B-pillar 15 and first chamber 230. Second chamber 230 has a front face 233 and a rear face 234, which may be coupled together at an outer seam. Second chamber 230 may be considered an extension of lower portion 212, wherein the second chamber comprises one or more additional inflation cells. Alternatively, second chamber 230 may be considered a separate inflatable airbag that is fluidly coupled to airbag 210. When in a deployed state, second chamber 230 allows more tension to be placed on bottom portion 212 of airbag 210 than would occur if the second chamber were not present. As such, second chamber 230 and airbag 210 mitigate the risk of occupant ejection.

Second chamber 230 may be coupled to rear face 214 of airbag 210 at uninflatable portions of airbag 210 and the second chamber. Second chamber 230 may only be coupled to airbag 210 at a vent 231, which is configured to allow inflation gas to pass from inflatable void 219 of airbag 210 to inflatable void 239 of the second chamber. As such, airbag 210 and second chamber 230 may be said to be in fluid communication. Also, inflatable void 219 and inflatable void 239 may be said to be in fluid communication. In one embodiment, vent 231 comprises a one-way valve.

Inflation gas may enter airbag 210 first and then enter second chamber 230, or alternatively, the inflation gas may enter the second chamber first and then enter airbag 210. Airbag 210 and second chamber 230 may be inflated by a single inflator or by multiple inflators. Second chamber 230 may comprise a single inflation cell, or alternatively, the chamber may be divided into more than one inflation cell via interior seams, which may comprise stitching. Second chamber 230 may be anchored to one or more vehicle structures via one or more tethers, independently of airbag 210, or alternatively, chamber 230 may only be coupled to vehicle structures via airbag 210. In one embodiment, chamber 230 is anchored to vehicle structures both independent of airbag 210 and via airbag 210.

Upon activation of an inflator and airbag 210 deployment, second chamber 230 assumes a predetermined location, which may be said to be predominantly along bottom portion 212 of airbag 210. Second chamber 230 is configured to cover predetermined vehicle pillars, such as B-pillar 15 and C-pillar 16, in a longitudinal manner (as depicted in FIG. 6). Second airbag 230 may be configured such that it does not overlap waist line 13. The size and shape of second chamber 230, as depicted in FIGS. 6-7 are for exemplary purposes only, and one skilled in the art will recognize that a variety of configurations of second chambers may be employed. For example, the height to which the second chamber achieves relative to the curtain airbag may be higher or lower than depicted. Further, the side elevation cross-sectional shape may vary from that depicted.

Figure 8:
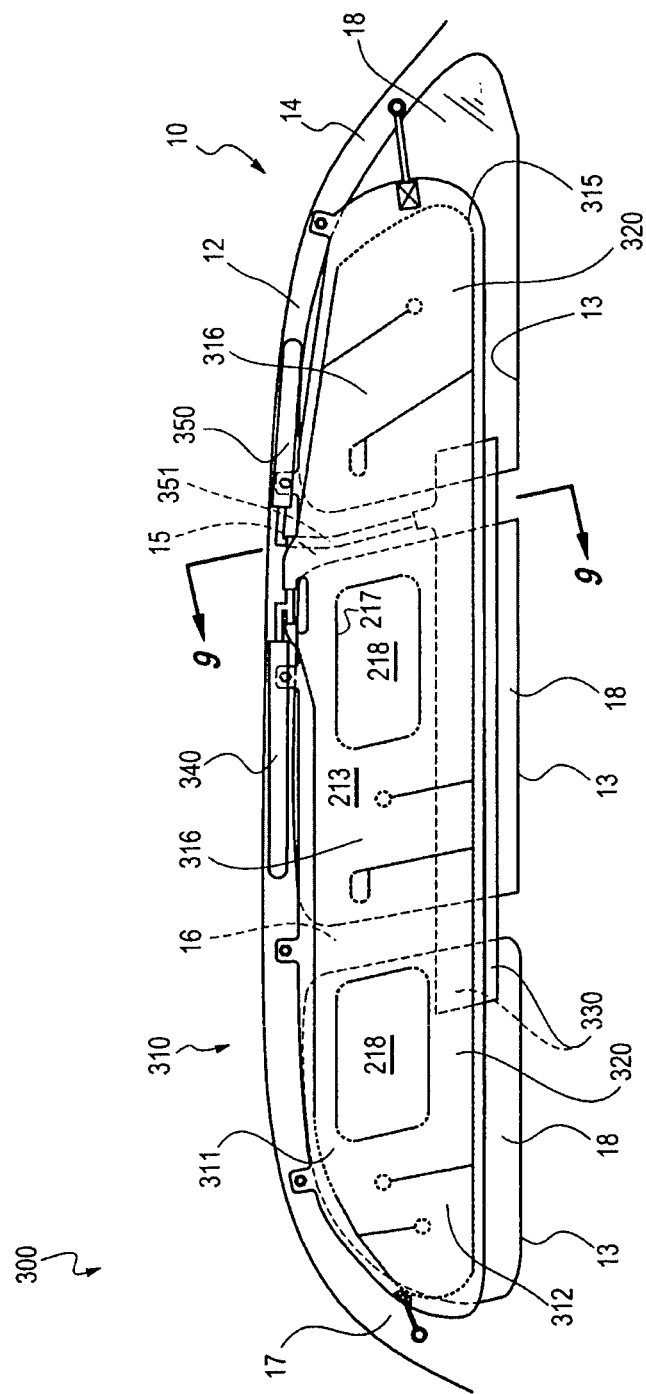
FIG. 8 is a side elevation view of another embodiment of an inflatable curtain airbag assembly.

FIG. 8 is a side elevation view of another embodiment of an inflatable airbag assembly 300 that is configured to mitigate the risk of occupant ejection. Airbag assembly 300 may be configured similarly to, and may function similarly as airbag assemblies 100 and 200, described herein. Inflatable airbag assembly 300 may comprise an inflatable airbag 310, a second chamber 330, a first inflator 340 and a second inflator 350. Assembly 300 is configured to impact protection and ejection mitigation for occupants of a vehicle 10. Vehicle 10 has a roof rail 12, a waist line 13, an A-pillar 14, a B-pillar 15, a C-pillar 16, a D-pillar 17, and windows 18. Waist line 13 may also be known as a belt line and is defined as a substantially horizontal line formed by the junction of vehicle windows 13 and tops of vehicle door panels. In other words, the waist line may be formed by the window sills of the vehicle doors.

According to the embodiment depicted in FIG. 8, airbag 310 has an upper portion 311, a lower portion 312, a front face 313, a rear face (not visible), an exterior seam 315, inflation cells 316, interior seams 317, uninflatable portions 318, an inflatable void (not visible), and a first chamber 320. The various faces of airbag membrane 310 define the inflatable void, which is in fluid communication with an inflator 340. The various faces of airbag 310 may be attached to each other using an outer seam 315 that comprise stitching. Likewise, inner seams 316 may comprise stitching and may couple the front and rear faces together, as well as forming uninflatable portions 318 and inflation cells 315. In the depicted embodiment, airbag 310 is an inflatable curtain airbag, which extends from an A-pillar 14 to a D-pillar 17. Airbag 310 also extends past a B-pillar 15 and a C-pillar 16 such that in a deployed configuration, the airbag at least partially covers the B- and C-pillars.

Second chamber 330 is configured to cover predetermined vehicle pillars, such as B-pillar 15 and C-pillar 16, in a longitudinal manner. Second chamber 330 is inflated by inflator 350 via an inflator tube 351. Inflator 350 comprises a different inflator than inflator 340, and second chamber 330 is configured such that inflation gas may not pass between the first and second chambers.

Upper portion 311 of airbag 310 is the portion of the airbag that is closest to the headliner of a vehicle when the airbag is in a deployed state. Lower portion 312 is below upper portion 311 when airbag 310 is in a deployed state, and is closest to a floor of the vehicle. The term "lower portion" is not necessarily limited to the portion of airbag 310 that is below a horizontal medial plane of the airbag, but may include less than half, more than half or exactly half of the bottom portion of the airbag. Likewise, the term "upper portion" is not necessarily limited to the portion of airbag 310 that is above a horizontal medial plane of the airbag, but may include less than half, more than half or exactly half of the top portion of the airbag.

Figure 9:
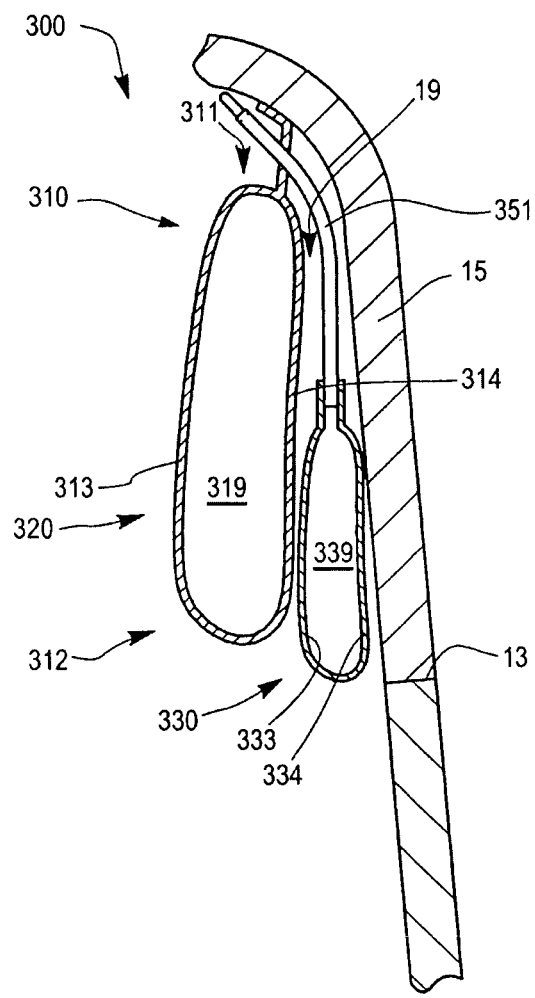
FIG. 9 is a side elevation cross-sectional view of the inflatable curtain airbag assembly of FIG. 8.

FIG. 9 depicts a side elevation cross-sectional view of assembly 300 at B-pillar 15. At cross section line 9-9 of FIG. 8, airbag 310 has an inflatable void 319 defined by front and rear faces 313 and 314. Inflatable void 319 spans top portion 311 and bottom portion 312 of the airbag, and may be called a first chamber 320. First chamber 320 may comprise one or more inflation cells. Airbag 310 does not overlap waist line 13. The side elevation cross-sectional shape of inflatable void 319 is substantially symmetrical, such that top portion 311 of airbag 310 has a cross-section width that is similar to bottom portion 312. Since B-pillar 15 is not perpendicular to the ground, but rather extends outwardly from the top of the pillar to the bottom, airbag 310 is closer to B-pillar 15 at top portion 311 than bottom portion 312. As such, the space 19 between bottom portion 312 of airbag 310 is greater than the space 19 between top portion 311 and B-pillar 15.

Second chamber 330 may comprise a front face 333, a rear face 334, and an inflatable void 339. Second chamber 330 may be configured similarly to second chamber 230, described herein, except that second chamber 330 is not in fluid communication with inflatable void 319 of airbag 310. Second chamber 330 is in fluid communication with a second inflator, which is distinct from the inflator that inflates first chamber 320. As such, an inflator tube 351 may be employed in some embodiments such that interior void 339 is fluidly coupled to the second inflator. Therefore, second chamber 330 may be considered a separate airbag from curtain airbag 310. Alternatively, inflatable void 339 may be inflated by the same inflator as inflatable void 319, wherein inflation gas flowing into inflatable void 319 follows a different path than inflation gas that flows into inflatable void 329. In such an embodiment, inflator tube 351 may be coupled to the first inflator.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable curtain airbag for use in a vehicle with a first and a second pillar, which are not perpendicular to a vertical axis of a vehicle and that are bowed with respect to a cabin of the vehicle such that the pillars expand away from the interior of the cabin from a top to a bottom of each pillar, the airbag comprising:

a top portion and a bottom portion, wherein the bottom portion comprises a horizontally oriented chamber that extends longitudinally from a first, non-horizotal, bowed pillar to a second, non-horizontal, bowed pillar of a vehicle when the inflatable curtain airbag is in a deployed configuration, wherein the inflatable curtain airbag, when in a deployed configuration, has a transverse cross-sectional width that increases from the top portion to the bottom portion such that the cross-sectional shape is asymmetric and such that the bottom portion comprises a volume that is greater than the top portion, wherein, the bottom portion of the curtain airbag is adjacent to the bottom of each pillar and the top portion of the curtain airbag is adjacent to the top of each pillar, when the curtain airbag is in a deployed configuration, wherein the bottom portion of the airbag does not extend below a waist line of the vehicle, wherein the inflatable curtain airbag is configured such that, in a deployed configuration, an inflatable void of the inflatable curtain airbag extends longitudinally across the second pillar of the vehicle and extends from the top portion downwardly adjacent to the second pillar of the vehicle to a bottom end of the bottom portion of the inflatable curtain airbag, wherein the shape of the curtain airbag, when in a deployed configuration, conforms to the contours of the pillars such that spacing between a surface of one of the pillars and an opposing surface of a section of the curtain airbag is approximately equal as measured between the top of each pillar and an opposing section of the top portion of the curtain airbag and as measured between the bottom of each pillar and an opposing section of the bottom portion of the curtain airbag, and wherein the top portion and the bottom portion of the curtain airbag each comprises at least one inflatable void positioned such that when the curtain airbag is in a deployed configuration, the voids are located between the pillars and adjacent to a window, and the surface of the void of the top portion and the surface of the void of the bottom portion are each located an approximately equal distance relative to an opposing surface of the window.

2. The inflatable curtain airbag of claim 1, wherein the bottom portion comprises a plurality of inflation cells, and wherein each inflation cell that is located adjacent to each of the first and second pillars comprises a larger volume than each of the inflation cells not located adjacent to the first and second pillars.

3. An inflatable curtain airbag for use in a vehicle with a first and a second pillar, which are not perpendicular to a vertical axis of a vehicle and that are bowed with respect to a cabin of the vehicle such that the pillars expand away from the interior of the cabin from a top to a bottom of each pillar, the airbag comprising:

a top portion and a bottom portion, wherein the bottom portion comprises a horizontally oriented chamber that extends longitudinally from a first, non-horizontal, bowed pillar to a second, non-horizontal, bowed pillar of a vehicle, when the inflatable curtain airbag is in a deployed configuration, wherein the curtain airbag, when in a deployed configuration, has a transverse cross-sectional width that increases from the top portion to the bottom portion and that continues to increase in cross-sectional width, in a downward direction, within the bottom portion such that the bottom portion comprises a volume that is greater than the top portion, wherein, the bottom portion of the curtain airbag is adjacent to the bottom of each pillar and the top portion of the curtain airbag is adjacent to the top of each pillar, when the curtain airbag is in a deployed configuration, wherein the bottom portion of the airbag does not extend below a waist line of the vehicle, and wherein the inflatable curtain airbag is configured such that, in a deployed configuration, an inflatable void of the inflatable curtain airbag extends longitudinally across the second pillar of the vehicle and extends from the top portion downwardly adjacent to the second pillar of the vehicle to a bottom end of the bottom portion of the inflatable curtain airbag.

4. The inflatable curtain airbag of claim 3, wherein the shape of the curtain airbag, when in a deployed configuration, conforms to the contours of the pillars such that spacing between a surface of one of the pillars and an opposing surface of a section of the curtain airbag is approximately equal as measured between the top of each pillar and an opposing section of the top portion of the curtain airbag and as measured between the bottom of each pillar and an opposing section of the bottom portion of the curtain airbag.

5. The inflatable curtain airbag of claim 3, wherein the inflatable curtain airbag is configured such that, in a deployed configuration, at least one uninflatable void is located between the pillars and adjacent to a window.

* * * * *